July 17, 1923.

P. WAJDIC

TIRE PUMP

Filed Dec. 17, 1921

Inventor
P. Wajdic

Patented July 17, 1923.

1,462,432

UNITED STATES PATENT OFFICE.

PETAR WAJDIC, OF PLEASANT UNITY, PENNSYLVANIA.

TIRE PUMP.

Application filed December 17, 1921. Serial No. 523,037.

*To all whom it may concern:*

Be it known that I, PETAR WAJDIC, a citizen of Jugo Slavia, residing at Pleasant Unity, in the county of Westmoreland and State of Pennsylvania, have invented certain new and useful Improvements in Tire Pumps, of which the following is a specification.

This invention relates to new and useful improvements in tire pumps, and has particular reference to the idea of mounting a manually operating tire pump within the rim or band of a spare tire carrier upon an automobile.

The primary object of the invention resides in the provision of a double operating pump with the pistons of the separate pump cylinders associated with a crank shaft that is adapted to reciprocate the pistons within the cylinders when the crank shaft is rotated.

The invention further embodies a single outlet hose connection for the two pump cylinders and an air gauge associated with the pump cylinders to determine the pressure of air passing through the hose.

This invention is a continuation in so far as shown and described of patent granted to me for improvements in tire pumps on July 13, 1920, No. 1,346,284, and embodies improvements thereover.

With these general objects in view and others that will appear as the nature of the invention is better understood, the same consists in the novel construction, combination and arrangement of parts hereinafter more fully described, illustrated in the accompanying drawing, and pointed out in the appended claims.

Figure 1:
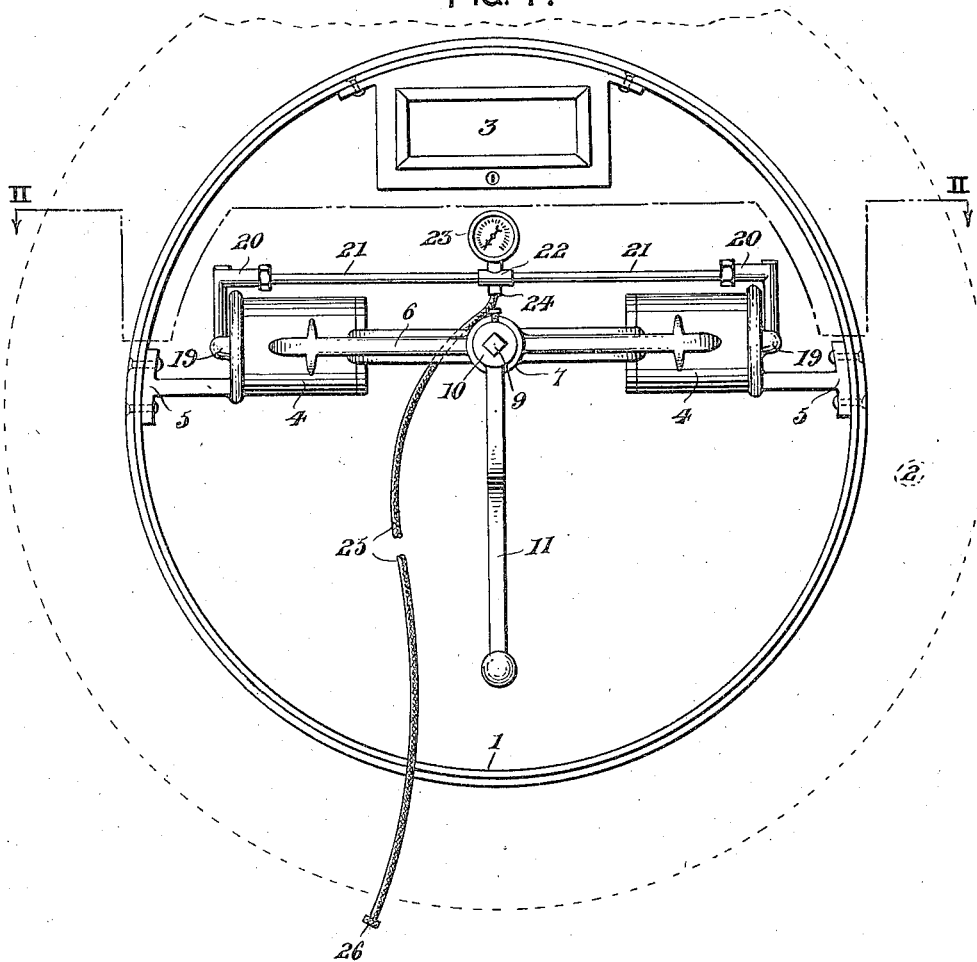
Figure 2:
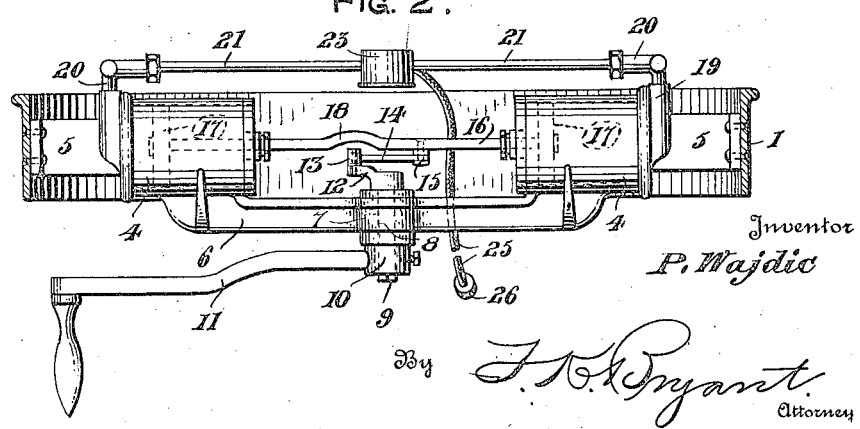

In the drawing forming a part of this application, and in which like designating characters refer to corresponding parts throughout the several views, Figure 1 is a front elevational view of a tire pump constructed in accordance with the present invention, the same being illustrated as mounted upon a spare tire carrier of an automobile, and with a tire shown by dotted lines, and Figure 2 is a horizontal sectional view taken on line II—II of Figure 1, showing the connecting rods between the pistons of the separate cylinders and the crank shaft for operating the pistons.

Referring more in detail to the accompanying drawing, there is illustrated an annular band or rim 1 for supporting a spare tire 2, the carrier being designed for attachment to an automobile, preferably at the rear end thereof. At the upper end of the rim carrier 1, a pump box or other receptacle 3 is provided, primarily intended for housing the hose of the pump and tools for use in connection with the automobile.

The tire pump includes a pair of spaced aligned cylinders 4 carried by brackets 5, secured to the tire carrier 1, the cylinders 4 being connected by the bracket arm 6 to form a rigid mounting therefor and also to maintain the same in proper alignment.

The bracket arm 6, intermediate the ends thereof, is provided with an enlarged bearing 7, within which a crank shaft 8 is journaled, the crank shaft projecting at opposite sides of the bracket arm 6 and having associated with the outer keyed end 9 thereof, the bearing 10 of a crank handle 11.

The inner end of the shaft 8 carries an offset crank arm 12 that is pivotally connected to one end 13 of a link 14, the other end of said link being pivotally connected as at 15 to the connecting rod 16 extending between the pistons 17 of the cylinders 4, the connecting rod 16 having an offset portion 18 to provide a clearance for the pivotal connection between the crank arm 12 and the link 14.

The outer end of each cylinder 4 is provided with an air outlet 19, to which an elbow 20 is connected, the horizontal legs of the elbows at the outer end of each cylinder being aligned and carrying pipe sections 21, the adjacent ends of the pipe sections 21 being connected by a cross fitting 22.

The upper end of the fitting 22 has an air pressure gauge 23 secured thereto and a lower section 24 of the fitting 22 carries an air hose 25 with an attaching nipple 26 upon the free end thereof.

From the above detailed description of the device, it is believed the construction and operation thereof will at once be apparent it being noted that rotation of the crank shaft 8 by the handle 11 will cause reciprocations of the pistons 17 within the pump cylinders 4 by the crank arm and link connections 12 and 14 with the connecting rod 16 for the pistons. Air delivered through the outlets 19 into the pipe sections 21 will pass through the hose 25 to the outlet end 26, the pressure of the air passing through the device being indicated upon the gauge 23. By the provision of the gauge 23 upon the pump, it is unnecessary to test the air pressure in the tire by a separate pressure indicator, as the gauge associated with the pump will actively determine the pressure of air forced into a tire. Another advantageous feature is the provision of the crank shaft 8 that may be rotated by the handle 11 to effect reciprocating movements of the pistons 17.

While the form of the invention herein shown and described is believed to be the preferable embodiment of the same, it is nevertheless to be understood that various forms, modifications and arrangements of parts may be made without departing from the spirit and scope of the invention as claimed.

What I claim is:—

1. A pump of the type described comprising an annular supporting member, pump cylinders within said annular member, brackets rigidly connecting said pump cylinders at their outer ends with said annular member, a piston in each cylinder, a connecting rod between the pistons, an offset portion formed in said piston connecting rod, a brace arm rigidly connecting said cylinders at their inner ends, said brackets and brace cooperating for holding said cylinders in alinement, and means to reciprocate said pistons, said means including a crank shaft journaled in said brace arm, crank arm carried by the inner end of said crank shaft, and a link connection between said crank arm and the piston connecting rod, said offset portion in the piston connecting rod being provided to afford clearance for said crank arm.

2. A pump of the type described comprising an annular supporting member, pump cylinders within said annular member, brackets rigidly connecting said pump cylinders at their outer ends with said annular member, a piston in each cylinder, a connecting rod between the pistons, an offset portion formed in said piston connecting rod, a brace arm rigidly connecting said cylinders at their inner ends and being provided with an enlarged bearing in its central portion, said brackets and brace arm being adapted for holding said cylinders in alinement, a crank shaft journaled in said bearing, the outer end of said crank shaft having a keyed portion, an operating means secured to said keyed portion of the outer end of said crank shaft, a crank arm carried by the inner end of said shaft, a link connection between said crank arm and piston connecting rod to effect reciprocation of the pistons during rotation of the crank shaft, said offset portion in the piston connecting rod being provided to afford clearance for said crank arm, an air pipe connected to the outer ends of said cylinders, a cross fitting connecting the adjacent ends of the pipe sections, an air pressure gage carried by one side of the cross fitting and an air delivery hose carried by the other side of the cross fitting.

3. A pump of the class described comprising an annular supporting member, cylinders within said annular member, brackets rigidly connecting said cylinders at their outer ends with said annular member, a brace rigidly connecting said cylinders and cooperating with said brackets for holding said cylinders in alinement and in a stationary position in respect to said annular member, pistons associated with said cylinders, and means to reciprocate said pistons within said cylinders.

In testimony whereof I affix my signature.

PETAR WAJDIC.